(12) United States Patent
Kochte

(10) Patent No.: US 6,676,781 B2
(45) Date of Patent: Jan. 13, 2004

(54) THERMOPLASTIC STRUCTURAL PIECE CONTAINING WELDED PORTION

(75) Inventor: Werner W. Kochte, Streetsboro, OH (US)

(73) Assignee: Formtech Enterprises, Inc., Stow, OH (US)

( * ) Notice: Subject to any disclaimer, the term of this patent is extended or adjusted under 35 U.S.C. 154(b) by 40 days.

(21) Appl. No.: 09/683,505

(22) Filed: Jan. 10, 2002

(65) Prior Publication Data

US 2002/0056503 A1 May 16, 2002

(51) Int. Cl.[7] ............................................... B32B 31/16
(52) U.S. Cl. ...................... 156/73.1; 156/272.2; 428/58
(58) Field of Search ......................... 156/73.1, 272.2, 156/308.2, 379.6, 580.1, 580.2; 428/57, 58

(56) References Cited

U.S. PATENT DOCUMENTS

| | | |
|---|---|---|
| 4,090,799 A | 5/1978 | Crotti et al. |
| 4,224,091 A | 9/1980 | Sager |
| 4,856,230 A | 8/1989 | Slocomb |
| 5,814,391 A | 9/1998 | Hutchison et al. |
| 5,858,287 A | 1/1999 | Scott |
| 5,879,770 A | 3/1999 | Hutchison et al. |
| 5,962,108 A | 10/1999 | Nestegard et al. |
| 6,001,201 A * | 12/1999 | Vincent et al. ............ 156/73.1 |
| 6,009,925 A * | 1/2000 | Hall et al. ................. 156/358 |
| 6,071,455 A | 6/2000 | Hutchison et al. |
| 6,103,035 A | 8/2000 | Hanson et al. |
| 6,283,810 B1 | 9/2001 | Evans |

* cited by examiner

Primary Examiner—James Sells
(74) Attorney, Agent, or Firm—Buckingham, Doolittle & Burroughs, LLP; Louis F. Wagner (57) ABSTRACT

The invention relates to a thermoplastic panel or piece having a resilient welded portion. The panel or piece of the present invention may be used in a variety of applications such as to provide sealing ends on thermoplastic panels or to create resiliently closable passages in thermoplastic panels through which wires and other objects may be passed while maintaining an even surface appearance of the baseboard panel. Other uses include attaching one or more thermoplastic pieces together. The invention also includes a method for making the subject thermoplastic panel or piece.

56 Claims, 3 Drawing Sheets

THERMOPLASTIC STRUCTURAL PIECE CONTAINING WELDED PORTION

BACKGROUND OF INVENTION

The invention relates to a thermoplastic panel or piece having a flexible, resilient welded portion affixed thereto. The panel or piece of the present invention may be used in a variety of applications such as to provide sealing ends on thermoplastic panels or to create resiliently closeable passages in thermoplastic panels through which wires and other objects may be passed while maintaining an even surface appearance of the baseboard panel.

The present invention pertains generally to the field of thermoplastic constructions such as those in office furnishings and equipment, hospital and clinic furnishings, cafeteria furnishings, office partitions, etc.

Office furnishings and equipment, and the like, are often put into service in environments where there is exposure to impact and abrasion, such as through heavy foot traffic, hand contact, or exposure to things in motion, such as dollies, carts, tables and chairs, wheelchairs and hospital beds. Office furnishings and equipment, and the like, are often provided with baseboards, railings and other pieces to resist or absorb impacts and scuffing, as well as to present and maintain an even and neat appearance. It is also often the case that such furnishings use trim pieces, and the like, to provide a continuous covering or finish. However, such pieces must be produced so as to be securely incorporated into the balance of the furnishing piece, such as along the top or bottom of office partitions. Accordingly, it is desirable to be able to produce a trim piece or panel capable of secure incorporation into a furnishing piece.

To achieve these ends, it is often desirable to be able to take advantage of two or more plastic materials having different flexion and appearance qualities by combining them into an integral part. This is complicated by the fact that attempts to incorporate different materials require a secondary adhesion operation involving specialized adhesives or the injection molding of different polymers under conditions that may not allow the two materials to sufficiently adhere and/or may mar the surface or other aesthetic qualities of the part (such as through the application of heat and/or pressure).

It is also often desirable to be able to produce plastic composites capable of being used as sight and/or light barriers, as well as to produce products that present and maintain desirable aesthetic qualities. Also, in many instances, these pieces must be made to allow the passage of various electrical and signal transmissive wires, fiber optic cables, and the like, which are often necessary to operate office equipment such as telephones, computers, copiers, projectors, lights, etc.

To this end, panels normally have been provided with holes or gaps to allow wires and cables to be passed through. However, the various potential applications of baseboard panels, their arrangement and their working environments make it difficult to predict where wire/cable access will be needed, and the size and number of wires or cables to be passed through at a given location.

One of the ways of constructing a gapped baseboard panel is to extrude a relatively rigid panel of material such as a rigid PVC. These panels are then cut to a desired length and a relatively flexible polymeric material, such as a flexible PVC material, is adhered to the relatively rigid material through use of an adhesive, such as a cyanoacrylate adhesive, in a secondary hand operation.

There are several problems attendant to the use of such adhesives in hand operations. One problem is that of ventilation. The adhered pieces must normally be carefully stacked to provide sufficient curing and ventilation. Also, in the case of cyanoacrylate adhesives, the vapor issuing from the curing adhesive can form a white deposit on the finished pieces, often rendering them unacceptable to the manufacturing customer. Naturally, any gaseous emissions from curing adhesive may pose a health hazard to the operator. Additionally, another problem with the use of adhesives with PVCs relates to the plasticizers which migrate from the PVC into the adhesive. This softens the adhesive and causes loss of its cohesive strength.

The use of liquid adhesives in hand operations are also inefficient. Liquid adhesive can be spilled, requiring cleanup, and hand operations, even when carefully done, can lead to gaps in the alignment between the rigid and flexible portions. It is therefore more difficult to manufacture such pieces within required tolerances.

Finally, the use of liquid in hand operations must rely upon the operator to dispense the appropriate amount of adhesive uniformly to be sure that a strong bond is achieved. This is often difficult to do efficiently in repetitive operations.

Accordingly, it is desirable to be able to produce a baseboard panel which can accommodate, alternatively, the throughput of a small or great number of wires (or wires of a small or great diameter) or remain unused, while maintaining an even appearance and without the use of separable parts.

It is further an object of the present invention to produce a finishing panel with a strong and uniform bond across the interface between the rigid and flexible portions, while eliminating the environmental hazards, inefficiencies and product objections discussed above.

It is also an object of the present invention to provide an aperture covering for a piece or panel which is durable and resists the impact and flexion often occurring in high traffic environments, and the like.

In view of the present disclosure and/or through practice of the present invention, other advantages and the solutions to other problems may become apparent.

SUMMARY OF INVENTION

One embodiment of the invention is a method of vibrationally welding a relatively flexible polymeric material onto a surface of a relatively less flexible material, typically both thermoplastic materials, using radio frequency welding. As used herein, the term "relatively flexible" may include, for instance, comparative references to the flexibility as between rigid and semi-rigid materials, rigid and flexible materials, semi-rigid materials and flexible materials, etc.

In this regard, the relatively flexible materials may include ethyl vinyl acetate (EVA), urethanes (such as thermoplastic polyurethanes), PVC-urethane alloys (such as those commercially available from Alpha Chemical & Plastics Corporation), flexible PVC, alloyed vinyls, thermoplastic rubbers (TPRs) and polyester elastomers, such as Hytrel® commercially available from DuPont®. The relatively more flexible polymeric material may be selected from the group consisting of those preferably having a Shore A hardness in the range of from about 60 to about 95 according to ASTM method D-2240, most preferably in the range of from about 70 to about 80 according to ASTM method D-2240.

The relatively rigid polymeric material may be any extrudable material, such as those selected from the group consisting of rigid or semi-rigid PVC. Such materials may have a Shore D hardness of at least 65 according to ASTM method D-785, preferably in the range of from about 50 to about 90 according to ASTM method D-785, preferably in the range of from about 78 to about 82 according to ASTM method D-785.

A second embodiment of the invention includes vibrationally (ultrasonic) welding a coextruded polymeric material onto a surface of a relatively rigid or semi-rigid material, said coextruded polymeric material as used herein being a coextruded polymer having a relatively flexible side and a rigid or semi-rigid side and wherein the bonding occurs via ultrasonic welding of the overlapping rigid or semi-rigid side of the coextruded material with the surface of the rigid or semi-rigid material.

The present invention also includes a part such as that made in accordance with the methods described herein. Such a part generally comprises: (1) a relatively rigid piece (which may be adapted to be attached to a furnishing piece; typically a thermoplastic material), having an application surface; and (2) a portion of a material (also typically a thermoplastic material) being relatively more flexible than the relatively rigid material, and welded onto the application surface of said rigid piece; or (3) a portion of a coextruded material (also typically a thermoplastic material having a relatively more flexible and a more rigid side) and welded onto the application surface of said rigid piece.

It is preferred that the polymeric extrudate be a semi-rigid or rigid material, preferably PVC, and most preferably having a Shore D hardness in the range of from about 78 to about 82. An example of such a material is PVC Formulation 87256, commercially available from Geon Corporation.

An example of a urethane material which may be used in accordance with the present invention, is Pellethane®, commercially available from Dow Chemical. An example of an ethylene-vinyl acetate copolymer which may be used in accordance with the present invention is ELVAX®, commercially available from Dow Chemical.

The materials which may be used for the relatively rigid and relatively flexible portions may be as given above.

These and other objects of this invention will be evident when viewed in light of the drawings, detailed description, and appended claims.

BRIEF DESCRIPTION OF DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION

Referring now to the drawings wherein the showings are for purposes of illustrating the preferred embodiment of the invention only and not for purposes of limiting the same, the Figures show the rigid or semi-rigid baseboard with flexible extension affixed thereupon. The following is a detailed description of the preferred embodiment of the proposed invention which is also considered to be the best mode.

Figure 1:
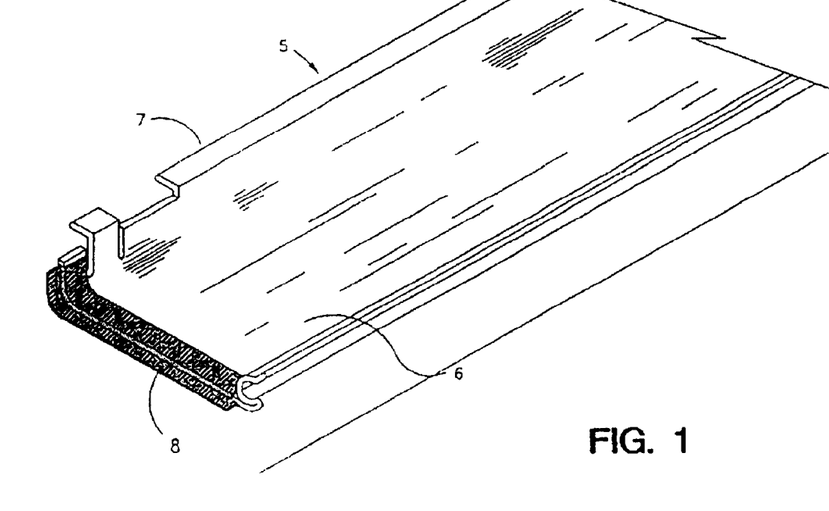
FIG. 1 is a sectioned perspective view of a thermoplastic panel designed for use as a baseboard panel of an office partition in accordance with one embodiment of the present invention.

FIG. 1 is a perspective view of a baseboard panel 5 in accordance with one embodiment of the present invention, showing the reverse or non-facing side 6 of polymeric panel portion 7. Polymeric panel portion 7 is preferable of a rigid or semi-rigid polyvinylchloride (PVC) material. Affixed to polymeric panel portion 7 is extension piece 8, a portion of which is flexible or relatively flexible in comparison to polymeric panel portion 7 and which is preferably sonic welded or radio frequency welded onto surface 6 and is preferable of a urethane material.

Figure 2:
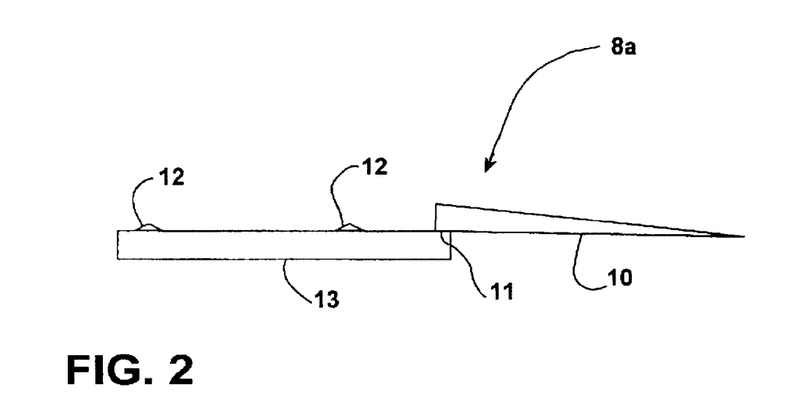
FIG. 2 is a greatly enlarged cross-sectional view of an extension piece.

FIG. 2 shows an enlarged cross-sectional view of an alternative embodiment of the invention utilizing a ribbed coextruded extension piece 8a. In this embodiment, extension piece 8a is comprised of two overlapping segments, one of said segments being rigid or semi-rigid 13 while a second of said segments being relatively more flexible 10. Said rigid or semi-rigid segment has at least one, preferably two ribs 12, the function of which is described later. The overlap 11 of the two segments may be greater or smaller than shown, the degree of overlap being a function of the strength of the bond required for the intended application.

Figure 3:
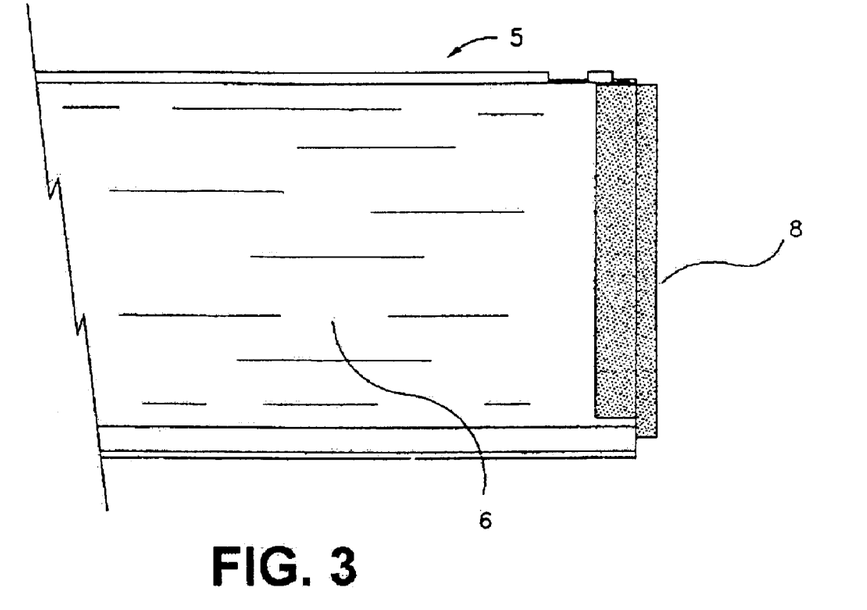
FIG. 3 is a sectioned elevational view of the facing side of the reverse side of a thermoplastic panel designed for use as a baseboard panel of an office partition in accordance with one embodiment of the present invention.
Figure 4:
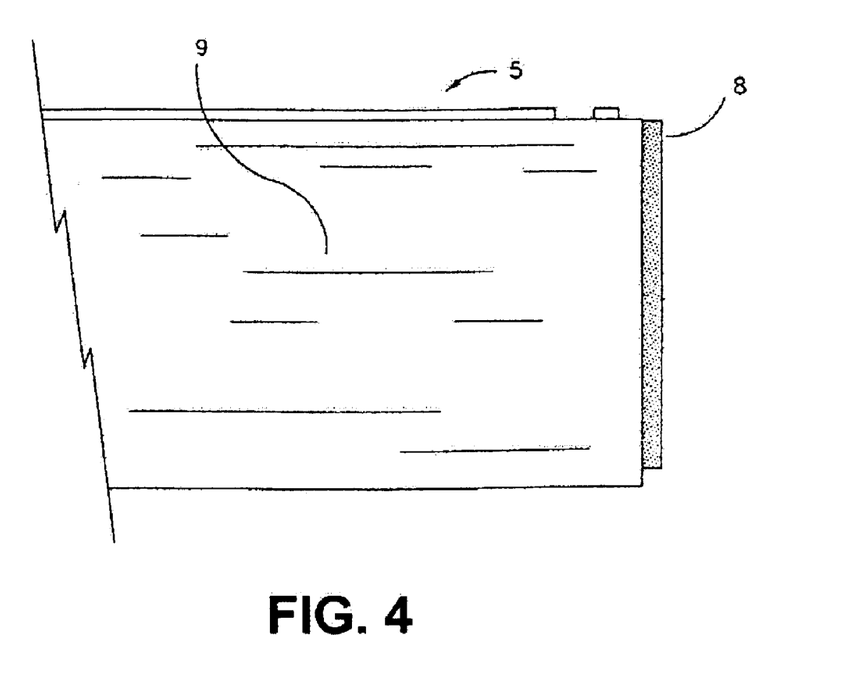
FIG. 4 is a sectioned elevational view of the facing side of a thermoplastic panel designed for use as a baseboard panel of an office partition in accordance with one embodiment of the present invention.

FIG. 3 shows a back view of baseboard panel 5 while FIG. 4 shows a front view of a baseboard panel 5 showing front or exposed surface 9.

As can be appreciated from FIGS. 1–4, flexible extension piece 8 or coextruded extension piece 8a, preferably has a cross-section with a very slight step-down which allows that portion of flexible extension piece 8 or 8a to extend from polymeric panel portion 7 to be substantially flush with front surface 9.

Figure 5:
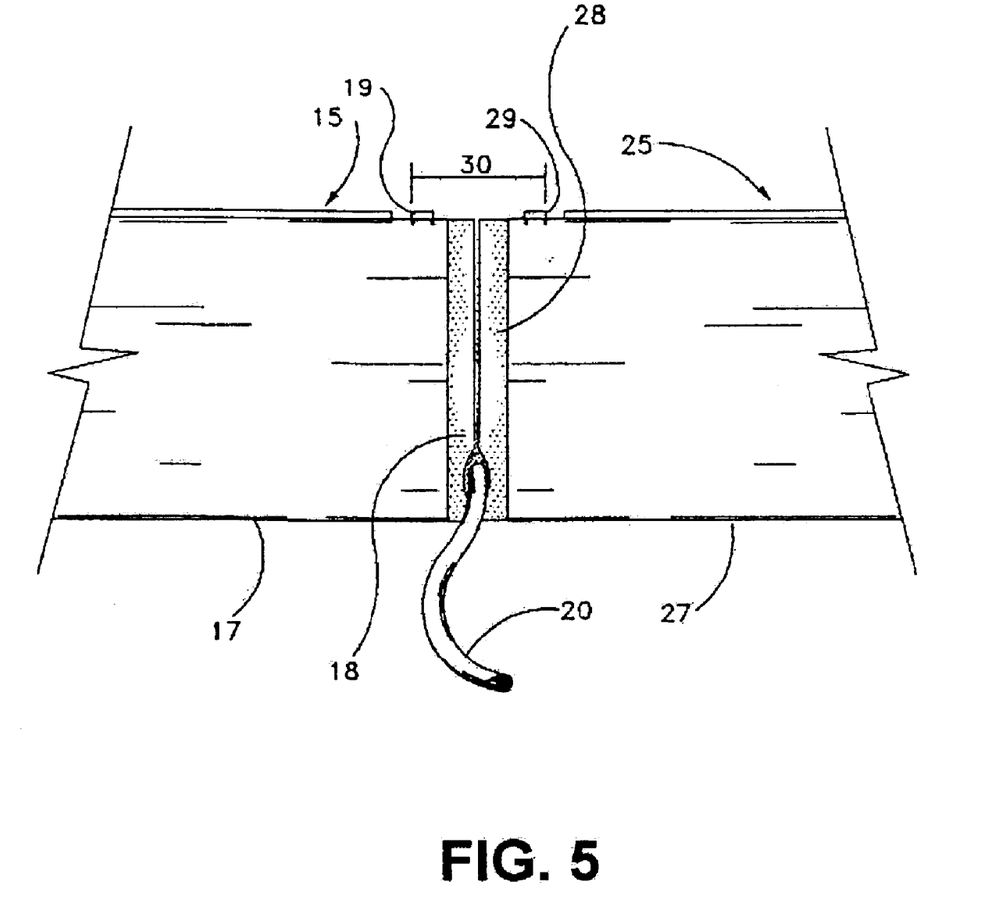
FIG. 5 is a sectioned elevational view of the facing side of two thermoplastic panels forming a portion of a baseboard panel of an office partition in accordance with one embodiment of the present invention.

FIG. 5 is a perspective view of two baseboard panels in accordance with one embodiment of the present invention, held at approximately 180 degrees to one another. Baseboard panel 75 comprises polymeric portion 17 and flexible extension portion 18. Baseboard panel 25 comprises polymeric panel portion 27 and flexible extension portion 28. Also shown are flexible attachment tabs 19 and 29 which are used to attach baseboard panels 15 and 25 along the bottom of, for instance, an office partition.

As can be seen in FIG. 5, baseboard panels 15 and 25 are attached in sufficiently close proximity to form a gap which is substantially covered by flexible extension pieces 18 and 28 (preferably overlapping). Flexible extension portions 18 and 28 thereby form a resiliently closable passage through the baseboard made up of baseboard panels 15 and 25. As is also shown in FIG. 5, this allows for the passage through the baseboard of one or more wires, cables, tubes, or fiber optic cables, etc. An example is electrical wire 20 shown in FIG. 5. The gap formed between baseboard panels 15 and 25, i.e. gap 30, maybe any appropriate width depending upon the intended application. For typical office applications, this gap may be from about $\frac{1}{32}$ inch to about 2 inches.

To produce a baseboard panel such as is shown in FIGS. 1, 3–5, a semi-rigid or rigid PVC material is extruded to form an appropriately sized and shaped profile which has a reverse and facing surface such as surfaces 6 and 9, respectively. As the polymeric panel portion is moved along to the end of the extruder line where it is cured, individual sections of the polymeric material are cut to the desired length. Typical of lengths for use in office applications may be in the range of from about ½ foot to about 8 feet.

As can be appreciated from the present disclosure, the panel and panel arrangements of the present invention maybe used for any of a wide variety of uses, such as in baseboards, along the sides and bottoms of office furniture, and even for household use. Producing panels and panel arrangements for a particular application will be a matter of selecting dimensions and shapes for the rigid and flexible portions, and is within the ability of one of ordinary skill in the art.

The present invention uses a method for sequentially welding flexible polymeric portions to the surfaces at either end of a series of thermoplastic extrudate members each having lead and trailing edges and surfaces adjacent thereto.

As used in this invention, welding involves either RF welding or ultrasonic welding. Ultrasonic welding requires a horn to be positioned over the weld, whereby the horn admits ultrasonic frequencies. In order to facilitate such ultrasound welding technique, the inner surface of extension 8a is provided with at least one, preferably two or more, raised ribs 12 which provide material to assure a proper weld by spreading under the influence of the ultrasound and thus enhance the weld. The raised ribs 12 will be of similar polymeric composition to that of rigid or semi-rigid component polymeric panel portion 7. Rigid or semi-rigid PVC is a particularly favored material in that it is particularly suitable for ultrasonic welding. Ultrasonic welds can be applied by known ultrasonic welding devices which have essentially a high-frequency electrical source designed to be resonant at a frequency between one and 100 kHz, (generally about 20 kHz), a transducer transforming the electrical energy into mechanical energy (vibration) and a device (resonator or sonotrode) amplifying the vibrations and transmitting them through the tips to the materials to be welded. The contact technique is employed with perhaps a pressure being exerted through the sonotrode on the material to be welded, which pressure may be as high as several $kg/cm^2$. The sonotrode can have one or more welding tips and these tips can have flat or hemispherical or substantially hemispherical ends, but in any case, are such as to create ultrasonic welds. When using ultrasonic welding, extension 8a will typically be a coextruded part, wherein the rigid or semi-rigid segment 13 with associated ribs 12 will be of at least similar, if not identical polymer chemical formulas. Ultrasonic welding of flexible polymers to rigid pieces is not favored.

Radio frequency (RF) welding is an alternative to thermal melt fusion and eliminates the need for ribs 12 as well as the need for coextruded pieces. RF welding accomplishes fusion through the presence of polymer polar groups converting the radio frequency energy into kinetic motion which heats the polymer. When a radio frequency field is applied to a thermoplastic polymer with polar groups, the ability of the polar groups to switch orientation in phase with the radio frequency will determine the degree to which RF energy is absorbed and converted to kinetic motion of the polar group. This kinetic energy is conducted as heat to the entire polymer molecule. If enough RF energy is applied, the polymer will heat sufficiently to melt. A useful measure in determining the degree to which a polymer will absorb energy from an alternating field is the relation of the polymer's dielectric constant and the dielectric dissipation factor known as the loss factor.

This dissipation factor is the ratio of the in-phase to out of phase power. If the polar groups in a thermoplastic polymer have a relative inability to switch orientations in the RF field, this results in a phase lag. This phase lag is known as the loss factor. The higher the dissipation factor, the greater the amount of heat a RF field will generate. Studies with thermoplastic polymers and radio frequency welding have demonstrated that thermoplastic polymers with dissipation factors of approximately 0.065 or higher will form useful welds. For example, PVC has a dissipation factor of approximately 0.09 to 0.10 at 1 MHz, nylon caprolactam has a dissipation factor of 0.06 to 0.09 and polycarbonate has a dissipation factor of only 0.01. The respective dielectric constants for these three compounds are 3.5, 6.4, and 2.96 at 1 MHz.

Polyethylene, polystyrene, and polycarbonate have very low dissipation factors and in practical use have poor radio frequency welding capability. The polyvinyl chlorides, polyurethanes, nylon, and polyesters have reasonably high dissipation factors and have been found in practical use to form very functional RF welds. Only those polar groups within the RF field will be put into motion. The convenience of RF welding is realized by this controlled heating of only the molecules within the RF field. The need for thermal insulation is obviated by the use of RF welding.

Therefore, what has been described includes a method or process for welding a flexible strip onto a rigid thermoplastic piece comprising the steps of: (a) positioning a length of a thermoplastic piece for a furnishing piece at a workstation; and (b) radio frequency welding an extension portion of a thermoplastic material onto at least a portion of the length of the inner surface of said thermoplastic piece, the thermoplastic material being relatively more flexible than the thermoplastic piece and extending beyond the lateral terminal edge, the outer surface being free from contact with said extension portion.

Also described is a method or process for welding a flexible strip onto a rigid thermoplastic piece comprising the steps of: (a) positioning a length of a thermoplastic piece for a furnishing piece at a workstation; and (b) ultrasonic welding an extension portion of a thermoplastic material onto at least a portion of a length of the inner surface of the thermoplastic piece, the coextruded extension portion comprising two at least partially overlapping segments, (i) a first of said segments having at least one rib (preferably 2) for ultrasonic welding onto the inner surface of the thermoplastic piece, and (ii) a second of the segments being relatively more flexible than the first segment, (iii) the first segment ultrasonically welded only onto the inner surface of the thermoplastic piece, and (iv) the second of the segments extending beyond the lateral terminal edge, the outer surface being free from contact with the coextruded extension portion, the extension portion extending along at least a portion of the length of said lateral terminal edge.

The part which is made by the process using radio frequency welding will be a thermoplastic part for a furnishing piece, the part having: (a) a thermoplastic piece adapted to be attached to said furnishing piece, the thermoplastic piece having an inner surface, an outer surface and a lateral terminal edge, this lateral terminal edge having a length; and (b) an extension portion of a thermoplastic material, this thermoplastic material being relatively more flexible than the thermoplastic piece, and radio frequency welded only onto the inner surface of the thermoplastic piece so as to extend beyond the lateral terminal edge, and free from contact with the extension portion. The extension portion extends along at least a portion of the length of the lateral terminal edge. The thermoplastic piece will be a thermoplastic polymer having a Shore D hardness in the range of from about 65 to about 90 inclusive according to ASTM method D-785 and the extension portion will be a thermoplastic polymer having a Shore A hardness in the range of from about 60 to about 95 inclusive according to ASTM method D-2240. Preferably, the thermoplastic piece will be a thermoplastic polymer having a Shore D hardness in the range of from about 78 to about 82 inclusive according to ASTM method D-785 and the extension portion will be a thermoplastic polymer having a Shore A hardness in the range of from about 70 to about 80 inclusive according to ASTM method D-2240. More preferably, the thermoplastic piece will be rigid polyvinyl chloride, and the extension portion of the thermoplastic material is selected from the group consisting of flexible polyvinyl chloride, ethyl vinyl acetates, urethanes, thermoplastic urethanes, PVC-urethane alloys, alloyed vinyls, thermoplastic rubbers, polyester elastomers, and polytetramethylene glycol esters. In a most preferred embodiment, the thermoplastic piece is rigid PVC and the extension portion is flexible PVC.

The part which is made by the process using ultrasonic welding will be a thermoplastic part for a furnishing piece, the part having: (a) a thermoplastic piece adapted to be attached to the furnishing piece, the thermoplastic piece having an inner surface, an outer surface and a lateral terminal edge having a length; and (b) a coextruded extension portion comprising two at least partially overlapping segments, a first segment having at least one rib for ultrasonic welding onto the inner surface of the thermoplastic piece, and a second segment being relatively more flexible than said first segment. The first segment is ultrasonically welded only onto the inner surface of the thermoplastic piece, and the second of the segments extending beyond the lateral terminal edge, this outer surface being free from contact with the coextruded extension portion and extending along at least a portion of the length of this lateral terminal edge. The thermoplastic piece and first segment of the coextruded extension portion will be a thermoplastic polymer having a Shore D hardness in the range of from about 65 to about 90 inclusive according to ASTM method D-785 and the second segment of the coextruded extension portion will be a thermoplastic polymer having a Shore A hardness in the range of from about 60 to about 95 inclusive according to ASTM method D-2240. Preferably, the thermoplastic piece and the first segment of the coextruded extension portion is a thermoplastic polymer having a Shore D hardness in the range of from about 78 to about 82 inclusive according to ASTM method D-785 and the second segment of the coextruded extension portion is a thermoplastic polymer having a Shore A hardness in the range of from about 70 to about 80 inclusive according to ASTM method D-2240. More preferably, the thermoplastic piece and the first segment of the coextruded extension portion is rigid polyvinyl chloride and the second segment of the coextruded extension portion of the thermoplastic material is selected from the group consisting of flexible polyvinyl chloride, ethyl vinyl acetates, urethanes, thermoplastic urethanes, PVC-urethane alloys, alloyed vinyls, thermoplastic rubbers, polyester elastomers, and polytetramethylene glycol esters. In a most preferred embodiment, the thermoplastic piece and first segment of said coextruded extension portion is rigid PVC and the second segment of the coextruded extension portion of the thermoplastic material is flexible PVC.

In light of the foregoing disclosure, it will be within the ability of one skilled in the extrusion and injection molding arts to make modifications to the present invention, such as through the substitution of equivalent materials and parts and the arrangement of parts, or the application of equivalent process steps, without departing from the spirit of the invention.

This invention has been described in detail with reference to specific embodiments thereof, including the respective best modes for carrying out each embodiment. It shall be understood that these illustrations are by way of example and not by way of limitation.

What is claimed is:

1. A thermoplastic part for a furnishing piece profile having at least one angle disposed therein, said part comprising:
   (a) a thermoplastic piece adapted to be attached to said profile, said profile having an inner surface and an outer surface and a lateral terminal edge, said lateral terminal edge having a length and at least one angle disposed up said length;
   (b) an extension portion of a thermoplastic material on said thermoplastic piece, said thermoplastic material being relatively more flexible than said thermoplastic piece, and radio frequency welded only onto said inner surface of said thermoplastic piece so as to extend beyond said lateral terminal edge, said outer surface being free from contact with said extension portion, said extension portion extending along the length of said lateral terminal edge with said at least one angle disposed therein.

2. The part according to claim 1 wherein
   (a) said thermoplastic piece comprises a thermoplastic polymer having a Shore D hardness in the range of from about 65 to about 90 inclusive according to ASTM method D-785; and
   (b) said extension portion comprises a thermoplastic polymer having a Shore A hardness in the range of from about 60 to about 95 inclusive according to ASTM method D-2240.

3. The part according to claim 2 wherein
   (a) said thermoplastic piece comprises a thermoplastic polymer having a Shore D hardness in the range of from about 78 to about 82 inclusive according to ASTM method D-785; and
   (b) said extension portion comprises a thermoplastic polymer having a Shore A hardness in the range of from about 70 to about 80 inclusive according to ASTM method D-2240.

4. The part according to claim 3 wherein
   (a) said thermoplastic piece comprises rigid polyvinyl chloride; and
   (b) said extension portion of said thermoplastic material is selected from the group consisting of flexible polyvinyl chloride, ethyl vinyl acetates, urethanes, thermoplastic urethanes, PVC-urethane alloys, alloyed vinyls, thermoplastic rubbers, polyester elastomers, and polytetramethylene glycol esters.

5. The part according to claim 4 wherein
   (a) said thermoplastic piece is rigid PVC; and
   (b) said extension portion of said thermoplastic material is flexible PVC.

6. A thermoplastic part for a furnishing piece profile having at least one angle disposed therein, said part comprising:
   (a) a thermoplastic piece adapted to be attached to said profile, said profile having an inner surface and an outer surface and a lateral terminal edge, said lateral terminal edge having a length and at least one angle disposed in said length;

(b) a coextruded extension portion on said thermoplastic niece comprising two at least partially overlapping segments,
 (i) a first of paid segments having at least one rib for ultrasonic welding onto the inner surface of said thermoplastic piece,
 (ii) a second of said segments being relatively more flexible than said first segment,
 (iii) said first segment ultrasonically welded only onto said inner surface of said thermoplastic piece, and
 (iv) said second of said segments extending beyond said lateral terminal edge, said outer surface being free from contact with said coextruded extension portion, said extension portion extending along the length of said lateral terminal edge with said at least one angle disposed therein.

7. The part according to claim 6 wherein
(a) said thermoplastic piece and said first segment of said coextruded extension portion comprises a thermoplastic polymer having a Shore D hardness in the range of from about 65 to about 90 inclusive according to ASTM method D-785; and
(b) said second segment of said coextruded extension portion comprises a thermoplastic polymer having a Shore A hardness in the range of from about 60 to about 95 inclusive according to ASTM method D-2240.

8. The part according to claim 7 wherein
(a) said thermoplastic piece and said first segment of said coextruded extension portion comprises a thermoplastic polymer having a Shore D hardness in the range of from about 78 to about 82 inclusive according to ASTM method D-785; and
(b) said second segment of said coextruded extension portion comprises a thermoplastic polymer having a Shore A hardness in the range of from about 70 to about 80 inclusive according to ASTM method D-2240.

9. The part according to claim 8 wherein
(a) said thermoplastic piece and said first segment of said coextruded extension portion comprises rigid polyvinyl chloride; and
(b) said second segment of said coextruded extension portion of said thermoplastic material is selected from the group consisting of flexible polyvinyl chloride, ethyl vinyl acetates, urethanes, thermoplastic urethanes, PVC-urethane alloys, alloyed vinyls, thermoplastic rubbers, polyester elastomers, and polytetramethylene glycol esters.

10. The part according to claim 9 wherein
(a) said thermoplastic piece and said first segment of said coextruded extension portion is rigid PVC; and
(b) said second segment of said coextruded extension portion of said thermoplastic material is flexible PVC.

11. A process for welding a flexible strip onto a rigid thermoplastic part for a furnishing piece profile having at least one angle disposed therein, comprising the steps of:
(a) positioning a length of a said profile at a workstation, said profile having an inner surface and an outer surface and a lateral terminal edge, said lateral terminal edge having a length and at least one angle disposed in said length;
(b) radio frequency welding a thermoplastic piece having an extension portion of a thermoplastic material onto said inner surface of said lateral terminal edge with said at least one angle disposed therein of said profile, said thermoplastic material being relatively more flexible than said profile and extending beyond said lateral terminal edge, said outer surface being free from contact with said extension portion.

12. The process according to claim 11 wherein
(a) said thermoplastic piece comprises a thermoplastic polymer having a Shore D hardness in the range of from about 65 to about 90 inclusive according to ASTM method D-785; and
(b) said extension portion comprises a thermoplastic polymer having a Shore A hardness in the range of from about 60 to about 95 inclusive according to ASTM method D-2240.

13. The process according to claim 12 wherein
(a) said thermoplastic piece comprises a thermoplastic polymer having a Shore D hardness in the range of from about 78 to about 82 inclusive according to ASTM method D-785; and
(b) said extension portion comprises a thermoplastic polymer having a Shore A hardness in the range of from about 70 to about 80 inclusive according to ASTM method D-2240.

14. The process according to claim 13 wherein
(a) said thermoplastic piece comprises rigid polyvinyl chloride; and
(b) said extension portion of said thermoplastic material is selected from the group consisting of flexible polyvinyl chloride, ethyl vinyl acetates, urethanes, thermoplastic urethanes, PVC-urethane alloys, alloyed vinyls, thermoplastic rubbers, polyester elastomers, and polytetramethylene glycol esters.

15. The process according to claim 14 wherein
(a) said thermoplastic piece is rigid PVC; and
(b) said extension portion of said thermoplastic material is flexible PVC.

16. A process for welding a flexible strip onto a rigid thermoplastic part for a furnishing piece profile having at least one angle disposed therein comprising the steps of:
(a) positioning a length of a said profile at a workstation, said profile having an inner surface and an outer surface and a lateral terminal edge, said lateral terminal edge having a length and at least one angle disposed in said length;
(b) ultrasonic welding a thermoplastic piece having a coextruded extension portion of a thermoplastic material onto said inner surface of said lateral terminal edge with said at least one angle disposed therein of said profile, a said coextruded extension portion comprising two at least partially overlapping segments,
 (i) a first of said segments having at least one rib for ultrasonic welding onto the inner surface of said thermoplastic piece, and
 (ii) a second of said segments being relatively more flexible than said first segment,
 (iii) said first segment ultrasonically welded only onto said inner surface of said thermoplastic piece, and
 (iv) said second of said segments extending beyond said lateral terminal edge, said outer surface being free from contact with said coextruded extension portion.

17. The process according to claim 16 wherein
(a) said thermoplastic piece and said first segment of said coextruded extension portion comprises a thermoplastic polymer having a Shore D hardness in the range of from about 65 to about 90 inclusive according to ASTM method D-785; and (b) said second segment of said coextruded extension portion comprises a thermoplastic polymer having a Shore A hardness in the range of from about 60 to about 95 inclusive according to ASTM method D-2240.

18. The process according to claim 17 wherein
(a) said thermoplastic piece and said first segment of said coextruded extension portion comprises a thermoplastic polymer having a Shore D hardness in the range of from about 78 to about 82 inclusive according to ASTM method D-785; and
(b) said second segment of said coextruded extension portion comprises a thermoplastic polymer having a Shore A hardness in the range of from about 70 to about 80 inclusive according to ASTM method D-2240.

19. The process according to claim 18 wherein
(a) said thermoplastic piece and said first segment of said coextruded extension portion comprises rigid polyvinyl chloride; and
(b) said second segment of said coextruded extension portion of said thermoplastic material is selected from the group consisting of flexible polyvinyl chloride, ethyl vinyl acetates, urethanes, thermoplastic urethanes, PVC-urethane alloys, alloyed vinyls, thermoplastic rubbers, polyester elastomers, and polytetramethylene glycol esters.

20. The process according to claim 19 wherein
(a) said thermoplastic piece and said first segment of said coextruded extension portion is rigid PVC; and
(b) said second segment of said coextruded extension portion of said thermoplastic material is flexible PVC.

21. A thermoplastic part for a furnishing piece profile having at least one angle disposed therein, said part comprising:
(a) a thermoplastic piece adapted to be attached to said profile, said profile having an inner surface and an outer surface and a lateral terminal edge, said lateral terminal edge having a length and at least one essentially perpendicular angle disposed in said length;
(b) an extension portion of a thermoplastic material on said thermoplastic piece, said thermoplastic material being relatively more flexible than said thermoplastic piece, and radio frequency welded only onto said inner surface of said profile so as to extend beyond said lateral terminal edge, and said outer surface being free from contact with said extension portion, and said extension portion extending along at least a portion of the length of said lateral terminal edge with said at least one essentially perpendicular angle disposed therein.

22. The part according to claim 21 wherein
(a) said thermoplastic piece comprises a thermoplastic polymer having a Shore D hardness in the range of from about 65 to about 90 inclusive according to ASTM method D-785; and
(b) said extension portion comprises a thermoplastic polymer having a Shore A hardness in the range of from about 60 to about 95 inclusive according to ASTM method D-2240.

23. The part according to claim 22 wherein
(a) said thermoplastic piece comprises a thermoplastic polymer having a Shore D hardness in the range of from about 78 to about 82 inclusive according to ASTM method D-785; and
(b) said extension portion comprises a thermoplastic polymer having a Shore A hardness in the range of from about 70 to about 80 inclusive according to ASTM method D-2240.

24. The part according to claim 23 wherein
(a) said thermoplastic piece comprises rigid polyvinyl chloride; and
(b) said extension portion of said thermoplastic material is selected from the group consisting of flexible polyvinyl chloride, ethyl vinyl acetates, urethanes, thermoplastic urethanes, PVC-urethane alloys, alloyed vinyls, thermoplastic rubbers, polyester elastomers, and polytetramethylene glycol esters.

25. The part according to claim 24 wherein
(a) said thermoplastic piece is rigid PVC; and
(b) said extension portion of said thermoplastic material is flexible PVC.

26. A thermoplastic part for a furnishing piece profile having at least one essentially perpendicular angle disposed therein, said part comprising:
(a) a thermoplastic piece adapted to be attached to said profile, said profile having an inner surface and an outer surface and a lateral terminal edge, said lateral terminal edge having a length and at least one angle disposed in said length;
(b) a coextruded extension portion on said thermoplastic piece comprising two at least partially overlapping segments,
(i) a first of said segments having at least one rib for ultrasonic welding onto the inner surface of said thermoplastic piece,
(ii) a second of said segments being relatively more flexible than said first segment,
(iii) said first segment ultrasonically welded only onto said inner surface of said thermoplastic piece, and
(iv) said second of said segments extending beyond said lateral terminal edge, said outer surface being free from contact with said coextruded extension portion, said extension portion extending along the length of said lateral terminal edge with said at least one essentially perpendicular angle disposed therein.

27. The part according to claim 26 wherein
(a) said thermoplastic piece and said first segment of said coextruded extension portion comprises a thermoplastic polymer having a Shore D hardness in the range of from about 65 to about 90 inclusive according to ASTM method D-785; and
(b) said second segment of said coextruded extension portion comprises a thermoplastic polymer having a Shore A hardness in the range of from about 60 to about 95 inclusive according to ASTM method D-2240.

28. The part according to claim 27 wherein
(a) said thermoplastic piece and said first segment of said coextruded extension portion comprises a thermoplastic polymer having a Shore D hardness in the range of from about 78 to about 82 inclusive according to ASTM method D-785; and
(b) said second segment of said coextruded extension portion comprises a thermoplastic polymer having a Shore A hardness in the range of from about 70 to about 80 inclusive according to ASTM method D-2240.

29. The part according to claim 28 wherein
(a) said thermoplastic piece and said first segment of said coextruded extension portion comprises rigid polyvinyl chloride; and
(b) said second segment of said coextruded extension portion of said thermoplastic material is selected from the group consisting of flexible polyvinyl chloride, ethyl vinyl acetates, urethanes, thermoplastic urethanes, PVC-urethane alloys, alloyed vinyls, thermoplastic rubbers, polyester elastomers, and polytetramethylene glycol esters.

30. The part according to claim 29 wherein
(a) said thermoplastic piece and said first segment of said coextruded extension portion is rigid PVC; and
(b) said second segment of said coextruded extension portion of said thermoplastic material is flexible PVC.

31. A process for welding a flexible strip onto a rigid thermoplastic part for a furnishing piece profile having at least one essentially perpendicular angle disposed therein, comprising the steps of:
(a) positioning a length of said profile at a workstation, said profile having an inner surface and an outer surface and a lateral terminal edge, said lateral terminal edge having a length and at least one essentially perpendicular angle disposed in said length; and
(b) radio frequency welding a thermoplastic piece having an extension portion of a thermoplastic material onto said inner surface of said lateral terminal edge with said at least one essentially perpendicular angle disposed therein of said profile, said thermoplastic material being relatively more flexible than said profile and extending beyond said lateral terminal edge, said outer surface being free from contact with said extension portion.

32. The process according to claim 31 wherein
(a) said thermoplastic piece comprises a thermoplastic polymer having a Shore D hardness in the range of from about 65 to about 90 inclusive according to ASTM method D-785; and
(b) said extension portion comprises a thermoplastic polymer having a Shore A hardness in the range of from about 60 to about 95 inclusive according to ASTM method D-2240.

33. The process according to claim 32 wherein
(a) said thermoplastic piece comprises a thermoplastic polymer having a Shore D hardness in the range of from about 78 to about 82 inclusive according to ASTM method D-785; and
(b) said extension portion comprises a thermoplastic polymer having a Shore A hardness in the range of from about 70 to about 80 inclusive according to ASTM method D-2240.

34. The process according to claim 33 wherein
(a) said thermoplastic piece comprises rigid polyvinyl chloride; and
(b) said extension portion of said thermoplastic material is selected from the group consisting of flexible polyvinyl chloride, ethyl vinyl acetates, urethanes, thermoplastic urethanes, PVC-urethane alloys, alloyed vinyls, thermoplastic rubbers, polyester elastomers, and polytetramethylene glycol esters.

35. The process according to claim 34 wherein
(a) said thermoplastic piece is rigid PVC; and
(b) said extension portion of said thermoplastic material is flexible PVC.

36. A process for welding a flexible strip onto a rigid thermoplastic part for a furnishing piece profile having at least one essentially perpendicular angle disposed therein comprising the steps of:
(a) positioning a length of said profile at a workstation, said profile having an inner surface and an outer surface and a lateral terminal edge, said lateral terminal edge having a length and at least one essentially perpendicular angle disposed in said length;

(b) ultrasonic welding a thermoplastic piece having a coextruded extension portion of a thermoplastic material onto said inner surface of said lateral terminal edge with said at least one essentially perpendicular angle disposed therein of said profile, said coextruded extension portion comprising two at least partially overlapping segments,
(i) a first of said segments having at least one rib for ultrasonic welding onto the inner surface of said thermoplastic piece, and
(ii) a second of said segments being relatively more flexible than said first segment,
(iii) said first segment ultrasonically welded only onto said inner surface of said thermoplastic piece, and
(iv) said second of said segments extending beyond said lateral terminal edge, said outer surface being free from contact with said coextruded extension portion.

37. The process according to claim 36 wherein
(a) said thermoplastic piece and said first segment of said coextruded extension portion comprises a thermoplastic polymer having a Shore D hardness in the range of from about 65 to about 90 inclusive according to ASTM method D-785; and
(b) said second segment of said coextruded extension portion comprises a thermoplastic polymer having a Shore A hardness in the range of from about 60 to about 95 inclusive according to ASTM method D-2240.

38. The process according to claim 37 wherein
(a) said thermoplastic piece and said first segment of said coextruded extension portion comprises a thermoplastic polymer having a Shore D hardness in the range of from about 78 to about 82 inclusive according to ASTM method D-785; and
(b) said second segment of said coextruded extension portion comprises a thermoplastic polymer having a Shore A hardness in the range of from about 70 to about 80 inclusive according to ASTM method D-2240.

39. The process according to claim 38 wherein
(a) said thermoplastic piece and said first segment of said coextruded extension portion comprises rigid polyvinyl chloride; and
(b) said second segment of said coextruded extension portion of said thermoplastic material is selected from the group consisting of flexible polyvinyl chloride, ethyl vinyl acetates, urethanes, thermoplastic urethanes, PVC-urethane alloys, alloyed vinyls, thermoplastic rubbers, polyester elastomers, and polytetramethylene glycol esters.

40. The process according to claim 39 wherein
(a) said thermoplastic piece and said first segment of said coextruded extension portion is rigid PVC; and
(b) said second segment of said coextruded extension portion of said thermoplastic material is flexible PVC.

41. A thermoplastic part for a furnishing piece profile, said part comprising:
(a) a thermoplastic piece adapted to be attached to said profile, said profile having an inner surface and an outer surface and a curvilinear lateral terminal edge, said curvilinear lateral terminal edge having a length;
(b) an extension portion of a thermoplastic material on said thermoplastic piece, said thermoplastic material being relatively more flexible than said thermoplastic piece, and radio frequency welded only onto said inner surface of said thermoplastic piece so as to extend beyond said lateral terminal edge, said outer surface being free from contact with said extension portion, said extension portion extending along the length of said curvilinear lateral terminal edge.

42. The part according to claim 41 wherein
   (a) said thermoplastic piece comprises a thermoplastic polymer having a Shore D hardness in the range of from about 78 to about 82 inclusive according to ASTM method D-785; and
   (b) said extension portion comprises a thermoplastic polymer having a Shore A hardness in the range of from about 70 to about 80 inclusive according to ASTM method D-2240.

43. The part according to claim 42 wherein
   (a) said thermoplastic piece comprises rigid polyvinyl chloride; and
   (b) said extension portion of said thermoplastic material is selected from the group consisting of flexible polyvinyl chloride, ethyl vinyl acetates, urethanes, thermoplastic urethanes, PVC-urethane alloys, alloyed vinyls, thermoplastic rubbers, polyester elastomers, and polytetramethylene glycol esters.

44. The part according to claim 43 wherein
   (a) said thermoplastic piece is rigid PVC; and
   (b) said extension portion of said thermoplastic material is flexible PVC.

45. A thermoplastic part for a furnishing piece profile, said part comprising:
   (a) a thermoplastic piece adapted to be attached to said profile, said profile having an inner surface and an outer surface and a curvilinear lateral terminal edge, said curvilinear lateral terminal edge having a length;
   (b) a coextruded extension portion on said thermoplastic piece comprising two at least partially overlapping segments,
      (i) a first of said segments having at least one rib for ultrasonic welding onto the inner surface of said thermoplastic piece,
      (ii) a second of said segments being relatively more flexible than said first segment,
      (iii) said first segment ultrasonically welded only onto said inner surface of said thermoplastic piece, and
      (iv) said second of said segments extending beyond said lateral terminal edge, said outer surface being free from contact with said coextruded extension portion, said extension portion extending along the length of said lateral curvilinear terminal edge.

46. The part according to claim 45 wherein
   (a) said thermoplastic piece comprises a thermoplastic polymer having a Shore D hardness in the range of from about 78 to about 82 inclusive according to ASTM method D-785; and
   (b) said extension portion comprises a thermoplastic polymer having a Shore A hardness in the range of from about 70 to about 80 inclusive according to ASTM method D-2240.

47. The part according to claim 46 wherein
   (a) said thermoplastic piece comprises rigid polyvinyl chloride; and
   (b) said extension portion of said thermoplastic material is selected from the group consisting of flexible polyvinyl chloride, ethyl vinyl acetates, urethanes, thermoplastic urethanes, PVC-urethane alloys, alloyed vinyls, thermoplastic rubbers, polyester elastomers, and polytetramethylene glycol esters.

48. The part according to claim 47 wherein
   (a) said thermoplastic piece is rigid PVC; and
   (b) said extension portion of said thermoplastic material is flexible PVC.

49. A process for welding a flexible strip onto a rigid thermoplastic part for a furnishing piece profile having at least one curvilinear lateral edge, comprising the steps of:
   (a) positioning a length of said profile at a workstation, said profile having an inner surface and an outer surface and a curvilinear lateral terminal edge, said curvilinear lateral terminal edge having a length; and
   (b) radio frequency welding a thermoplastic piece having an extension portion of a thermoplastic material onto said inner surface of said curvilinear lateral terminal edge, said thermoplastic material being relatively more flexible than said profile and extending beyond said curvilinear lateral terminal edge, said outer surface being free from contact with said extension portion.

50. The part according to claim 49 wherein
   (a) said thermoplastic piece comprises a thermoplastic polymer having a Shore D hardness in the range of from about 78 to about 82 inclusive according to ASTM method D-785; and
   (b) said extension portion comprises a thermoplastic polymer having a Shore A hardness in the range of from about 70 to about 80 inclusive according to ASTM method D-2240.

51. The part according to claim 50 wherein
   (a) said thermoplastic piece comprises rigid polyvinyl chloride; and
   (b) said extension portion of said thermoplastic material is selected from the group consisting of flexible polyvinyl chloride, ethyl vinyl acetates, urethanes, thermoplastic urethanes, PVC-urethane alloys, alloyed vinyls, thermoplastic rubbers, polyester elastomers, and polytetramethylene glycol esters.

52. The part according to claim 51 wherein
   (a) said thermoplastic piece is rigid PVC; and
   (b) said extension portion of said thermoplastic material is flexible PVC.

53. A process for welding a flexible strip onto a rigid thermoplastic part for a furnishing piece profile having at least one curvilinear lateral edge, comprising the steps of:
   (a) positioning a length of said profile at a workstation, said profile having an inner surface and an outer surface and a curvilinear lateral terminal edge, said curvilinear lateral terminal edge having a length;
   (b) ultrasonic welding a thermoplastic piece having a coextruded extension portion of a thermoplastic material onto said inner surface of said curvilinear lateral terminal edge, said coextruded extension portion comprising two at least partially overlapping segments,
      (i) a first of said segments having at least one rib for ultrasonic welding onto the inner surface of said thermoplastic piece, and
      (ii) a second of said segments being relatively more flexible than said first segment,
      (iii) said first segment ultrasonically welded only onto said inner surface of said thermoplastic piece, and
      (iv) said second of said segments extending beyond said curvilinear lateral terminal edge, said outer surface being free from contact with said coextruded extension portion.

54. The part according to claim 53 wherein
   (a) said thermoplastic piece comprises a thermoplastic polymer having a Shore D hardness in the range of from about 78 to about 82 inclusive according to ASTM method D-785; and (b) said extension portion comprises a thermoplastic polymer having a Shore A hardness in the range of from about 70 to about 80 inclusive according to ASTM method D-2240.

55. The part according to claim 54 wherein
(a) said thermoplastic piece comprises rigid polyvinyl chloride; and
(b) said extension portion of said thermoplastic material is selected from the group consisting of flexible polyvinyl chloride, ethyl vinyl acetates, urethanes, thermoplastic urethanes, PVC-urethane alloys, alloyed vinyls, thermoplastic rubbers, polyester elastomers, and polytetramethylene glycol esters.

56. The part according to claim 55 wherein
(a) said thermoplastic piece is rigid PVC; and
(b) said extension portion of said thermoplastic material is flexible PVC.

\* \* \* \* \*